Patented Aug. 24, 1943

2,327,442

UNITED STATES PATENT OFFICE 2,327,442

DOMESTIC HEATER

Edmund McCarthy, Tenafly, N. J.

Application February 1, 1941, Serial No. 377,022

4 Claims. (Cl. 110—147)

This invention relates to new and useful improvements in solid fuel-fired domestic heating furnaces, and more particularly to the construction and arrangement of the fire-boxes and air and gas ducts of such furnaces.

One object of the present invention is to provide a solid fuel-fired domestic heating furnace embodying certain novel features of construction and arrangement affording substantially greater utility and comparatively high over-all efficiency.

Another object of the invention is to provide a solid fuel-fired domestic heating furnace embodying novel features of construction and arrangement whereby relatively low burning fuel ignition rates may be maintained for comparatively long periods of time.

Another object of the invention is to provide a solid fuel-fired domestic heating furnace of the character set forth embodying novel features of construction and arrangement whereby fuel combustion may be maintained at normal operating conditions with comparatively long periods of time between re-fueling.

Still another object of the invention is to provide a solid fuel-fired domestic heating furnace of the character set forth embodying novel features of construction and arrangement whereby the burning rate of the fuel may be controlled depending upon the heat demand and wherein relatively rapid adjustment of the burning rate of fuel may be effected in accordance with such demand thereby to avoid both over-heating and under-heating.

A further object of the present invention is to provide a solid fuel-fired domestic heating furnace of the type described embodying novel features of construction and arrangement for preventing over-heating of the ash bed and thereby avoiding and eliminating the formation of troublesome clinkers.

These and other objects of the invention and the various features and details of the construction and operation thereof are hereinafter fully set forth and shown in the accompanying drawing, in which.

Figure 1:
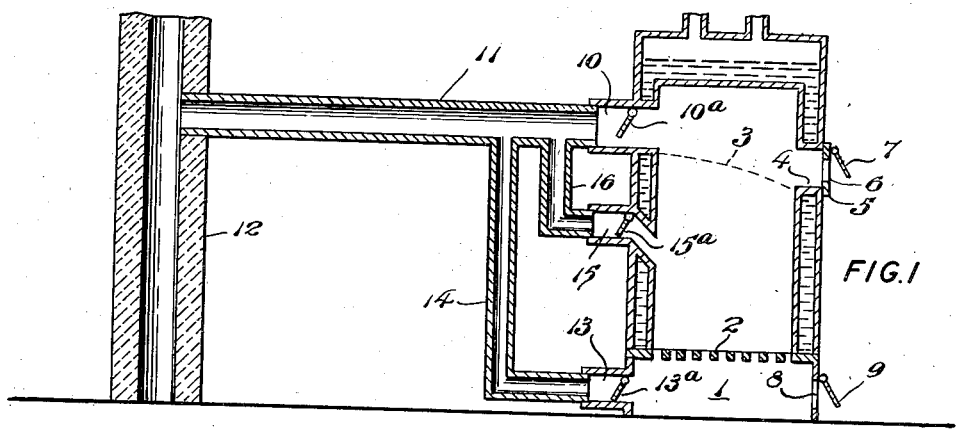
Figure 1 is a view in section vertically through a solid fuel-fired domestic heating furnace installation embodying the present invention.

Referring now to the drawing, the particular heater or furnace illustrated in Figure 1 is of the hot water or steam type and, as shown, is provided with an ash pit 1 overlying which is a grate 2 for supporting a bed of solid fuel such as coal, coke or the like. In the present instance, the fuel bed supported by the grate 2 is of substantial depth or height and the upper surface thereof is normally maintained at a level spaced substantially above the grate 2 as indicated at 3.

Fuel is supplied to the heater or furnace through a suitable opening 4 normally closed by a door 5 which has an air inlet 6 therein provided with a damper 7 for controlling the flow of air therethrough. The ash pit 1 of the heater or furnace has an air intake 8 provided with a damper or valve 9 operable in the usual manner to control the admission of air to said ash pit 1.

Leading from the heater or furnace at a point above the level or surface of the fuel bed therein is an air and combustion gas duct 10 which is connected by means of a pipe, conduit, or the like, 11, to the conventional flue or stack 12. Similarly leading from the ash pit 1 below the grate 2 is an air and gas duct 13 and this is connected by means of a suitable conduit 14 into the aforesaid pipe 11 which leads from the duct 10 to the flue or stack 12.

In addition to the ducts 10 and 13, and leading from the heater or furnace at a point approximately midway of the depth or height of the fuel bed intermediate the surface 3 thereof and the supporting grate 2, is another air and combustion gas duct 15. This duct 15 is connected by means of a conduit or pipe 16 to the previously mentioned pipe 11 and, as shown in the drawing, this duct 15 inclines outwardly from the heater or furnace for the purpose of preventing said duct from becoming clogged or stopped-up by the fuel.

The several ducts, 10, 13 and 15 are provided respectively with dampers or valves 10a, 13a and 15a, and these dampers or valves are operable selectively to control and regulate the flow of air and combustion gases from the heater or furnace and ash pit and thereby control and regulate combustion of the fuel as desired in a manner hereinafter more fully explained. It will be obvious, of course, that the several dampers or valves may be controlled manually or by any suitable automatic control mechanism of the type now commonly in use.

Further in this connection, it is pointed out that the dampers or valves 13a and 15a in the ducts 13 and 15 are constructed and arranged so as to enable said ducts to be completely closed and thus prevent the passage of any air or combustion gases therethrough. On the other hand, the damper or valve 10a in the duct 10 is smaller than said duct 10 so that when this damper 10a is in what otherwise would be its fully closed position, the duct 10 still remains partially open to permit a restricted flow of air and combustion gases outwardly therethrough thus preventing overheating of the heater or furnace and the consequent formation of clinkers. This condition does not exist in connection with the ducts 13 and 15 and their valves or dampers 13a and 15a are operable to completely close said ducts, as aforesaid, for the purpose of affording a maximum range of draft control.

Figure 2:
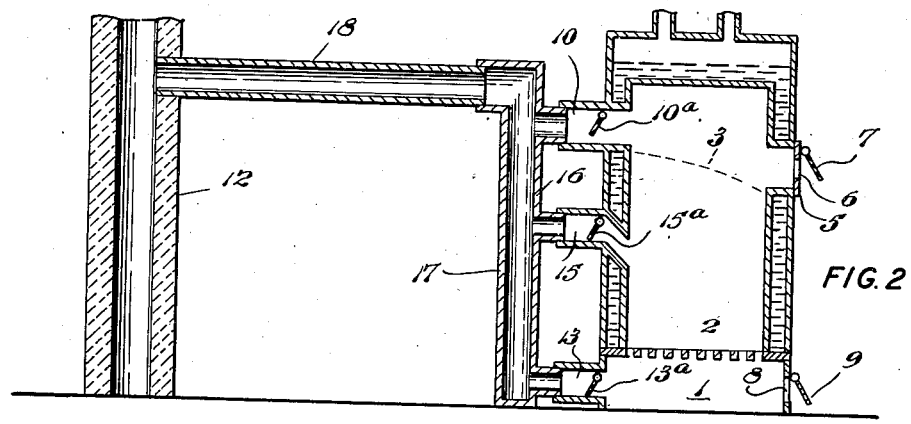
Figure 2 is a view similar to Figure 1 showing a modified arrangement of the invention in a solid fuel-fired domestic heating furnace installation.
Figure 3:
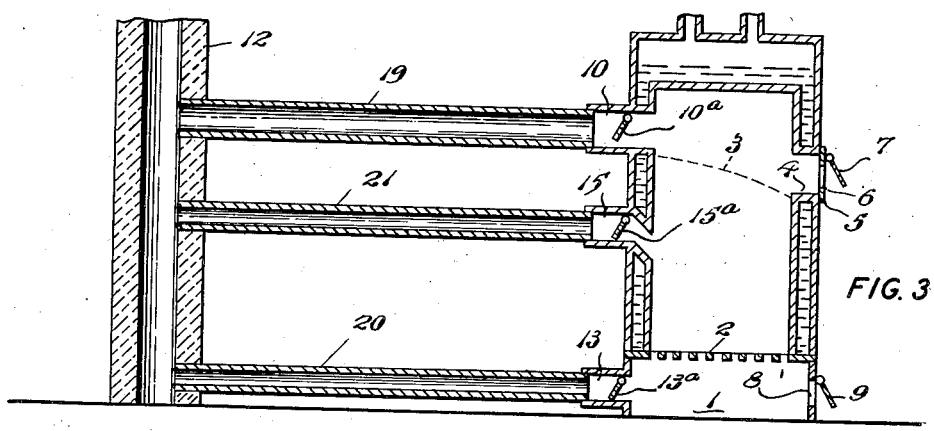
Figure 3 is a view similar to Figure 1 showing still another modified arrangement of the invention in a solid fuel-fired domestic heating furnace installation.

Referring now to Figures 2 and 3 of the drawing, the construction and arrangement of the heaters or furnaces and the air and gas ducts 10, 13 and 15 are identical to that shown and described in connection with Figure 1, except that in Figure 2 all of the ducts 10, 13 and 15 lead, in the first instance, into a common vertical conduit 17 which has its upper end connected to the flue or stack 12 by means of a horizontal conduit or pipe 18, while in Figure 3 said ducts 10, 13 and 15 are each connected, independently of one another, directly to the flue 12 by means of horizontally disposed conduits or pipes 19, 20 and 21, respectively.

Operation of the heater or furnace to produce the objectives sought contemplates, on the one hand, the control of the temperature of air and combustion gases entering the flue or stack 12 and, on the other hand, the regulation of the volume of air passing upwardly through the grate 2 from the ash pit 1 with respect or in relation to the volume of air that is flowing out of said ash pit 1 through its duct 13 as controlled by the position of the damper 13a in that duct. In operating the heater or furnace some air is admitted at all times to the ash pit 1 through the air inlet or intake opening 8 to prevent overheating of the ash pit and thereby assist in eliminating clinkering conditions. Now when there is a demand upon the heater or furnace for heat, if the air and gas temperature in the flue 12 is neither too high nor too low, the valve or damper 13a in the ash pit duct 13 is moved to duct-closing position. At the same time, the valve or damper 15a in the duct 15 is moved to duct-closing position, and the damper or valve 10a in the duct 10 is moved to open position. The several dampers or valves remain in these positions until the heater or furnace has produced sufficient heat to satisfy the requirement of the particular demand or until the flue gas temperature becomes too great, at which time the ash pit duct damper or valve 13a is moved to open position, while the damper or valve 15a remains closed and the damper or valve 10a is moved to duct-closing position. Under normal conditions the several dampers remain in these relative positions until there is again a demand for heat upon the heater or furnace.

Apart from the foregoing, should the flue gas temperature drop to a point below which a draft sufficient for ready pick-up of the fire cannot be sustained, the damper or valve 15a is moved to open position and the ash pit damper 13a is simultaneously moved to its closed position until the minimum flue gas temperature is obtained, after which the dampers or valves 15a and 13a will be moved to their closed and open positions respectively. Over-fire air for the combustion of fuel gases emitted by the fire may be admitted as required through the fuel door port 6 under control and regulation by its damper or valve 7.

From the foregoing it will be seen that the present invention provides a novel solid fuel-fired domestic heater or furnace which provides for the operation thereof with fuel beds of substantial depth or height with the result that the fuel ignition rate may be maintained relatively low for comparatively long periods of time and wherein normal fuel combustion operating conditions may be maintained with comparatively long intervals between re-fueling or firing thereof. In addition, the novel construction and arrangement of air and gas ducts in the furnace permits of the highly efficient use of the fuel beds of substantial depth or height and, at the same time, affords adequate regulation and control of the rate of combustion of the fuel as required, together with relatively rapid adjustment in such burning rate as may be required to avoid both under-heating and over-heating with respect to such demand. Too, the construction and arrangement of the ducts and their operation provides a furnace of the present type having a fuel bed of substantial depth or height wherein clinkering and like troublesome conditions are substantially eliminated.

It will be obvious, of course, that the present invention is applicable, in addition, for use in conjunction with heaters or furnaces of the hot water or steam type illustrated, it will be observed that the invention can be employed with equal effectiveness in domestic heaters or furnaces of the hot air and other types, and while certain embodiments of the invention have been herein illustrated and described, it is not intended that the invention be limited to such disclosure but that changes and modifications may be made and incorporated therein within the scope of the annexed claims.

I claim:

1. A domestic heating furnace for burning solid fuel having an ash pit, a grate above said ash pit for supporting a fuel bed of substantial depth, an air inlet to the ash pit below said grate, a fuel inlet above the normal surface level of the fuel bed, means for controlling the passage of air to the furnace through said ash pit inlet, a flue adjacent said furnace, a first duct leading outwardly from said ash pit, a second duct leading outwardly from the furnace at a point above the normal surface level of the fuel bed, a third duct leading outwardly from said furnace at a point above the grate therein and below the normal surface level of the fuel bed, means connecting the said ducts to said flue, and means in each of said first, second and third ducts operable selectively to regulate and control the passage of air and combustion gases outwardly through each of said ducts.

2. A domestic heating furnace for burning solid fuel having an ash pit, a grate above said ash pit for supporting a fuel bed of substantial depth, an air inlet to the ash pit below said grate, a fuel inlet above the normal surface level of the fuel bed, means for controlling the passage of air to the furnace through said ash pit inlet, a first duct leading outwardly from said ash pit, a second duct leading outwardly from the furnace at a point above the normal surface level of the fuel bed, a third duct leading outwardly from said furnace at a point above the grate therein and below the normal surface level of the fuel bed, and valve means in each of said first, second and third ducts operable selectively to regulate and control the passage of air and combustion gases outwardly through each of said ducts, said valve means in the first and third ducts being arranged and operable to completely close said ducts and prevent the passage of air and combustion gases outwardly therethrough and said valve means in the second duct being arranged and operable when in closed position to only partially close said second duct so as to permit a restricted flow of air and combustion gases outwardly therethrough.

3. A domestic heating furnace as claimed in claim 1 wherein the third duct leads from the furnace at a point approximately midway of the depth of the fuel bed and at least the furnace end of said duct is inclined upwardly and outwardly of said furnace.

4. A domestic heating furnace as claimed in claim 2 wherein the third duct leads from the furnace at a point approximately midway of the depth of the fuel bed and at least the furnace end of said duct is inclined upwardly and outwardly of said furnace.

EDMUND McCARTHY.